(12) United States Patent
Denson et al.

(10) Patent No.: US 11,225,943 B2
(45) Date of Patent: Jan. 18, 2022

(54) SYSTEM AND METHOD FOR THREE DIMENSIONAL POSITIONING A WIND TURBINE BLADE AND A PLURALITY OF SAW BLADES WITH RESPECT TO EACH OTHER FOR MAKING A PLURALITY OF CUTS IN A WIND TURBINE BLADES FOR RECYCLING

(71) Applicant: Best Blade Recycling, LLC, Lubbock, TX (US)

(72) Inventors: Michael Ray Denson, Abilene, TX (US); Marcus Brandon Denson, Tuscola, TX (US)

(73) Assignee: BEST BLADE RECYCLING, LLC, Lubbock, TX (US)

( * ) Notice: Subject to any disclaimer, the term of this patent is extended or adjusted under 35 U.S.C. 154(b) by 0 days.

(21) Appl. No.: 16/797,959

(22) Filed: Feb. 21, 2020

(65) Prior Publication Data
US 2020/0340445 A1  Oct. 29, 2020

Related U.S. Application Data

(60) Provisional application No. 62/860,770, filed on Jun. 12, 2019, provisional application No. 62/837,665, filed on Apr. 23, 2019.

(51) Int. Cl.
| | | |
|---|---|---|
| F03D 1/06 | (2006.01) |
| B23D 47/02 | (2006.01) |
| B23D 59/00 | (2006.01) |
| B29L 31/08 | (2006.01) |
| F03D 13/10 | (2016.01) |
| B23D 45/00 | (2006.01) |
| E02F 3/96 | (2006.01) |

(52) U.S. Cl.
CPC ......... *F03D 1/0675* (2013.01); *B23D 45/003* (2013.01); *B23D 47/02* (2013.01); *B23D 59/006* (2013.01); *E02F 3/963* (2013.01); *F03D 13/10* (2016.05); *B29L 2031/085* (2013.01); *F05B 2230/50* (2013.01); *F05B 2230/60* (2013.01); *F05B 2240/302* (2013.01); *F05B 2280/6003* (2013.01)

(58) Field of Classification Search
CPC .................. F03D 1/0675; F03D 13/10; F05B 2280/6003; F05B 2230/50; F05B 2240/302; F05B 2230/60; B29L 2031/085; B23D 47/02; B23D 59/006
See application file for complete search history.

(56) References Cited

U.S. PATENT DOCUMENTS

| | | | | |
|---|---|---|---|---|
| 2,998,813 A | * | 9/1961 | Wilson | B28D 1/042 125/13.03 |
| 5,158,648 A | * | 10/1992 | Weldon | D21G 9/0072 162/193 |
| 6,250,192 B1 | * | 6/2001 | Akram | B28D 5/024 125/13.01 |
| 6,467,385 B1 | * | 10/2002 | Buttrick | B23D 45/003 29/897.2 |

(Continued)

FOREIGN PATENT DOCUMENTS

DE         102016000134 A1 *  7/2017  .............. B23C 3/12

*Primary Examiner* — Jonathan G Riley
(74) *Attorney, Agent, or Firm* — G. Michael Roebuck

(57) ABSTRACT

The present invention relates to a system and method for cutting and manipulating the used wind turbine blades for disposal.

8 Claims, 6 Drawing Sheets

(56) References Cited

U.S. PATENT DOCUMENTS

| | | | | |
|---|---|---|---|---|
| 7,000,658 | B1* | 2/2006 | Soukiassian | B23D 45/027<br>144/114.1 |
| 8,650,997 | B1* | 2/2014 | Simon | B23D 47/025<br>83/100 |
| 10,435,178 | B2* | 10/2019 | Lofstrom | B64F 5/10 |
| 2002/0162438 | A1* | 11/2002 | Lim | B28D 5/025<br>83/279 |
| 2005/0103175 | A1* | 5/2005 | O'Banion | B23D 45/021<br>83/477.2 |
| 2006/0135041 | A1* | 6/2006 | Boone | B24C 3/04<br>451/5 |
| 2006/0213341 | A1* | 9/2006 | Hogan | B23D 45/048<br>83/13 |
| 2008/0087153 | A1* | 4/2008 | Lee | B23D 47/045<br>83/435.11 |
| 2008/0223188 | A1* | 9/2008 | Snartland | B23D 45/024<br>83/471.3 |
| 2009/0140684 | A1* | 6/2009 | Otsuki | G05B 19/404<br>318/572 |
| 2009/0255390 | A1* | 10/2009 | Chaffin | A22C 17/0006<br>83/168 |
| 2010/0098549 | A1* | 4/2010 | Mironov | B29D 99/0028<br>416/229 R |
| 2012/0037276 | A1* | 2/2012 | Granberg | B27B 17/005<br>144/378 |
| 2014/0260849 | A1* | 9/2014 | Johnson | B23C 3/18<br>83/39 |
| 2016/0132039 | A1* | 5/2016 | Hsu | G05B 19/19<br>700/160 |
| 2016/0182833 | A1* | 6/2016 | Debus | H04N 7/181<br>700/122 |
| 2016/0263775 | A1* | 9/2016 | Boon | B24B 27/0608 |
| 2018/0308014 | A1* | 10/2018 | White | G05B 19/40931 |
| 2019/0066062 | A1* | 2/2019 | Lilly | G06Q 50/04 |
| 2019/0070680 | A1* | 3/2019 | Lilly | B23D 57/0069 |
| 2019/0211801 | A1* | 7/2019 | Ravn | F03D 1/0683 |
| 2019/0299343 | A1* | 10/2019 | Schuring | F03D 1/0675 |
| 2020/0061725 | A1* | 2/2020 | Lilly | F03D 80/00 |

* cited by examiner

Side View of Y-cutter spar/blade lifting beam

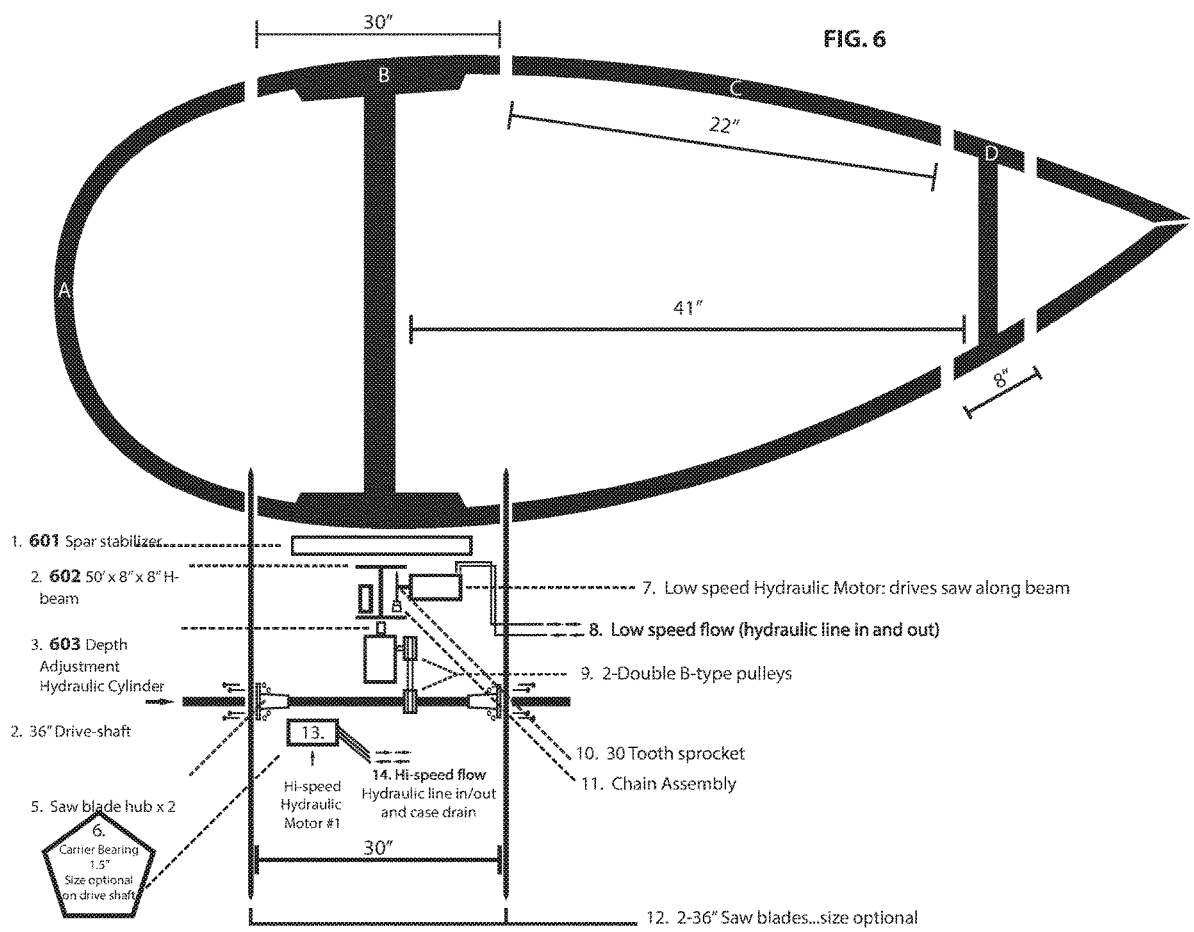

US 11,225,943 B2

SYSTEM AND METHOD FOR THREE DIMENSIONAL POSITIONING A WIND TURBINE BLADE AND A PLURALITY OF SAW BLADES WITH RESPECT TO EACH OTHER FOR MAKING A PLURALITY OF CUTS IN A WIND TURBINE BLADES FOR RECYCLING

RELATED APPLICATIONS

This patent application claims priority from patent application by Mike Denson et al., filed on Jun. 12, 2019 and entitled A System and Method for Three-dimensional Positioning a Wind Turbine Blade and a Plurality of Saw Blades with Respect to Each Other for Making a Plurality of Cuts in a Wind Turbine Blades for Recycling, U.S. Patent application Ser. No. 62/860,770, which is incorporated herein by reference and U.S. Provisional Patent Application Ser. No. 62/837,665 filed on 23 Apr. 2019 by Mike Denson et al. entitled A System and Method for Cutting and Manipulating Wind Turbine Blades, both of which are hereby incorporated by reference in their entirety.

BACKGROUND OF THE INVENTION

Wind turbine blades wear out and have to be replaced. The used blades are over 120 feet long and are not easily disposed of due to the size of the used wind turbine blades.

FIELD OF THE INVENTION

The present invention relates to a system and method for cutting and manipulating the used wind turbine blades for disposal and recycling.

SUMMARY OF THE INVENTION

The present invention relates to a system and method for independently manipulating wind turbine blades and saws for cutting reducing the volume of the wind turbine blade for recycling.

BRIEF DESCRIPTION OF THE DRAWINGS

The invention will be better understood in reference to the following drawings, which are examples of an illustrative embodiment and are not limiting as different embodiments of the invention may be realized.

FIG. 6 depicts a particular illustrative embodiment of the invention wherein the saw cuts the bottom surface of a wind turbine blade section.

DETAILED DESCRIPTION OF AN ILLUSTRATIVE EMBODIMENT OF THE INVENTION

Figure 1:
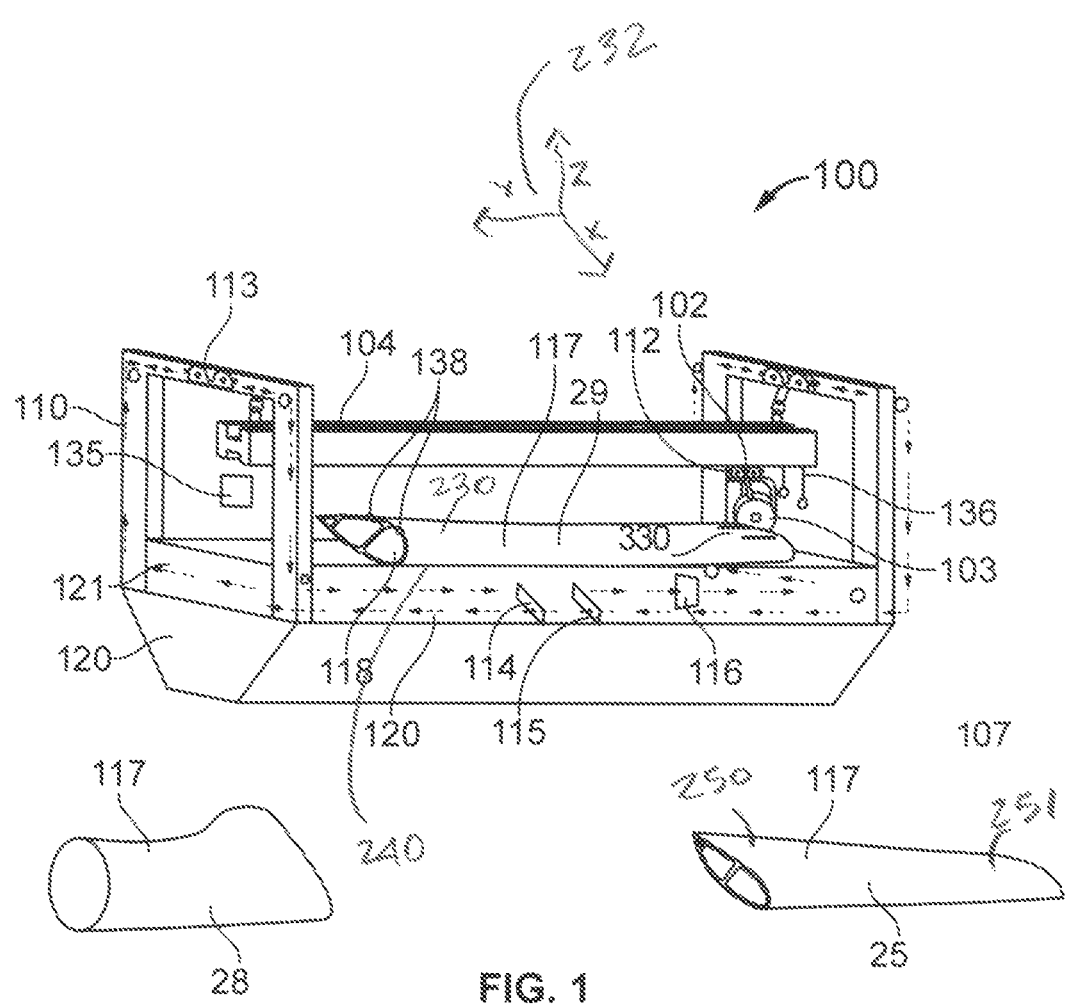
FIG. 1 depicts a particular illustrative embodiment of the invention showing an independent three-dimensional saw positioning system for a saw blade and an independent three-dimensional positioning a wind turbine blade section for cutting the wind turbine blade section.

The present invention discloses a system and method for cutting and manipulating wind turbine blades.

As shown in the drawings, in a particular illustrative embodiment of the invention a system and method for cutting and manipulating wind turbine blades is disclosed. In a particular illustrative embodiment of the invention a system and method are disclosed wherein a three-dimensional wind turbine blade positioning system for independently positioning a turbine blade and a three-dimensional saw positioning system for independently positioning a saw having a first set of two saw blades. The wind turbine blade section and the first saw are independently positioned with respect to each other for making multiple cuts in the surface of the turbine blade section so that the turbine blade is reduced in volume and removed from a turbine site for recycling.

FIG. 1 depicts a particular illustrative embodiment of the invention showing an independent three-dimensional saw positioning system for a saw blade and an independent three-dimensional wind turbine blade positioning system for positioning a wind turbine blade section for cutting the wind turbine blade section into pieces and reducing a volume occupied by an uncut wind turbine blade section. Turning now to FIG. 1, as shown in FIG. 1, in a particular illustrative embodiment of the invention a system is disclosed including but not limited to an H-beam 104 suspended from a saw rack 110 above a wind turbine blade section 29 resting on a wind turbine blade section support platform 121; a self-propelled first saw 102 having a self-propelled dolly 112 attached to the first self-propelled saw 102 having a first set of two saw blades 103, wherein the self-propelled first saw is attached to a moving self-propelled dolly 112 moving along the H-beam 104; an independent three-dimensional saw positioning system including but not limited to an x-y-axis saw system positioner 113 and a z-axis system saw positioner 114; a wind turbine blade section 29 supported by the wind turbine blade section support platform 121; an independent three-dimensional wind turbine blade positioning system comprising an x-axis wind turbine blade positioner 114, a y-axis wind turbine blade positioner 115 and a z-axis wind turbine blade positioner 116, wherein the independent three-dimensional saw positioning system manipulates the first saw and the first set of saw blades on the self-propelled saw and the independent three-dimensional wind turbine blade positioning system manipulates the turbine blade section with respect to the saw, so that a top surface 117 of an outer shell 118 of the wind turbine blade section of the wind turbine blade and a longitudinal axis of a path for the self-propelled saw are substantially parallel so that the saw path of the first saw and the first set of two saw blades along the longitudinal axis of the wind turbine blade, cuts through the outer shell of the wind turbine blade; and a trough 120 positioned below the wind turbine blade section. Thus, the wind turbine section positioning system works independently from the saw positioning system to align the wind turbine blade section and the first saw for cutting the wind turbine blade section. The two independent positioning systems position the first saw and the wind turbine blade section to enable the first saw to cut a longitudinal cut along a surface of the wind turbine blade section while maintaining the first saw above the wind turbine blade section a distance apart that is less than a cutting radius of the first set of two saw blades on the first saw and substantially parallel to a longitudinal axis of the wind turbine blade section and a spar running inside of a middle section 29 of the wind turbine blade. Thus, in a particular illustrative embodiment of the invention, a first set of saw blades on the first saw are small radius saw blades having a depth of cut of 5 inches, the thickness of the wind turbine blade is 2 inches and the two independent positioning system maintain a distance between the saw and the wind turbine blade section of 2 inches during a cut so that the 5 inch saw blade has 3 inches of cutting depth while cutting through the 2 inch thick wind turbine blade section. In additional embodiments of the invention, larger and smaller saw blade radii providing larger and smaller depths of cut and larger and smaller distances between the saw and the wind turbine blade section are used to accommodate different wind turbine blades. Once the two independent positioning systems are set up at a particular location, all wind turbine blade sections are substantially identical and one setting for the two independent positioning systems is maintained for all wind turbine blade sections on a particular project. In a particular embodiment of the invention, a first large spar is cut from a center wind turbine blade section 29.

As shown in FIG. 1, the wind turbine blade has curvilinear top surface 230 and a curvilinear bottom surface 240. The wind turbine blade has a thick end 250 and a thin end 251. A x, y, z coordinate set of axes 232 is shown for reference.

Figure 2:
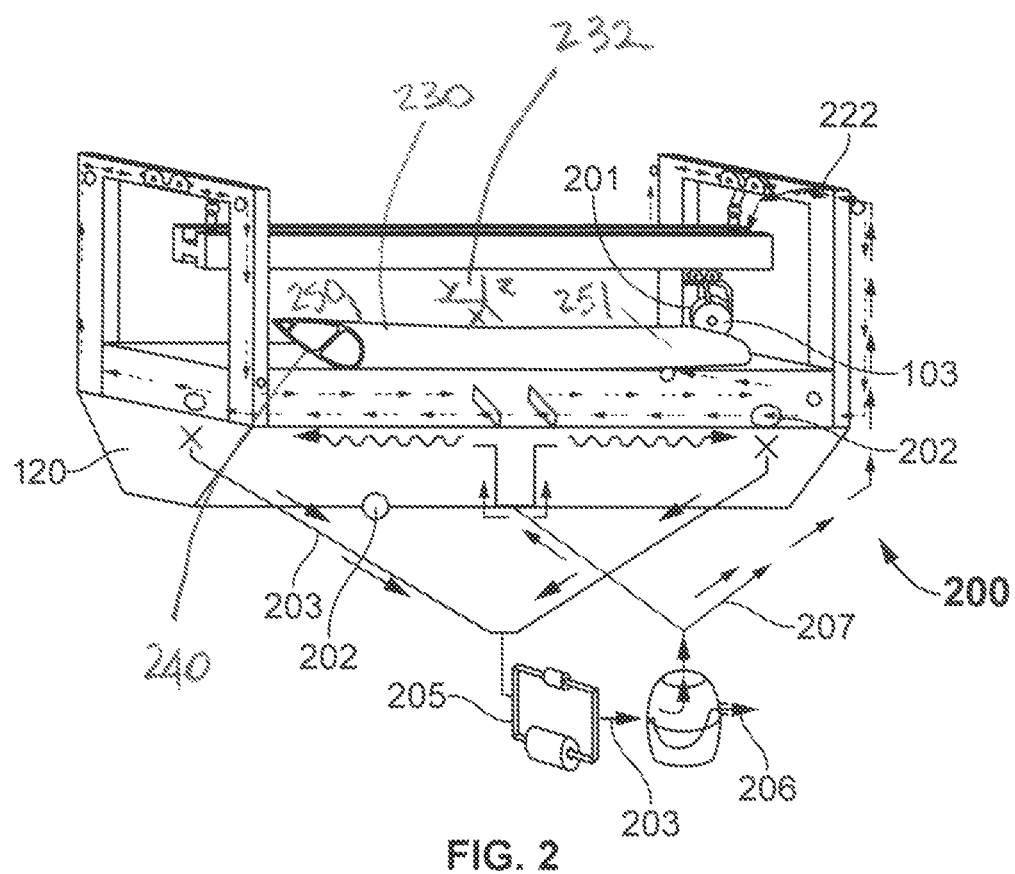
FIG. 2 depicts a particular illustrative embodiment of the invention showing an independent three-dimensional saw positioning system for a saw blade and an independent three-dimensional positioning a wind turbine blade section for cutting the wind turbine blade section.

FIG. 2 depicts a particular illustrative embodiment of the invention showing an independent three-dimensional saw positioning system for a saw blade and an independent three-dimensional wind turbine blade section for cutting the turbine blade section. As shown in FIG. 2, in another particular embodiment of the invention, the system further includes but is not limited to a water system 200 having a water supply line 222 and a plurality of water-jet sprayers 201, wherein each one of the water-jet sprayers is positioned adjacent one the first set of two saw blades that spray water the first set of two saw blades creating a mixture 203 of water and debris generated from the saw cutting through the wind turbine blade section shell; and a trough 120 positioned below In another particular embodiment of the invention, the system further includes but is not limited to a drain 202 formed in a bottom of the trough for removing from the bottom of the trough, a mixture 203 of debris and water created by the water-jet sprayers spraying on the first set of saw blades during cutting the wind turbine blade section, wherein the water-jet sprayers, spray water on the mixture in the trough and urging the mixture toward the drain formed in the trough and returning water filtered from the mixture to the water sprayer.

In another particular embodiment of the invention, the system further includes but is not limited to a pump 205 in line between the drain and a water system return path; a filter 206 in line between the drain 202 and a water system return path, wherein the filter separates the water and debris from the mixture of water and debris, wherein the water system return path 207 returns the water separated from the mixture by the filter to the water supply system.

Figure 3:
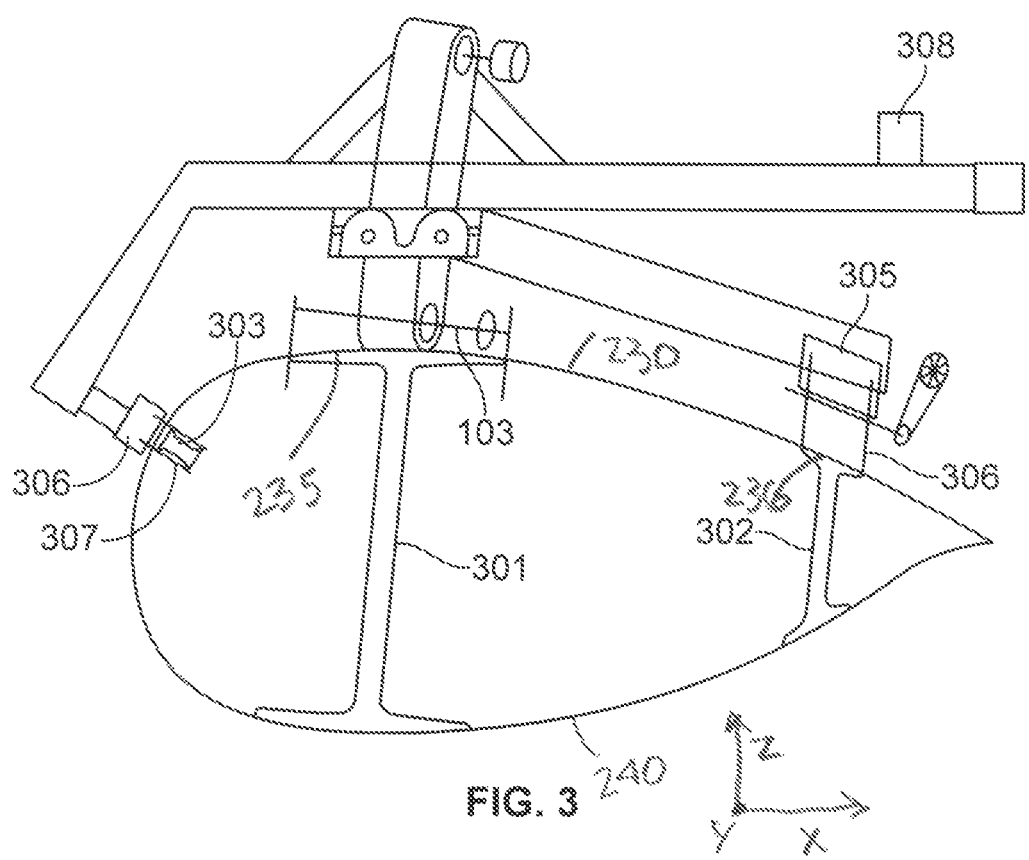
FIG. 3 depicts a particular illustrative embodiment of the invention showing an independent three-dimensional saw positioning system for a saw blade and an independent three-dimensional positioning a wind turbine blade section for cutting the wind turbine blade section.
Figure 4:
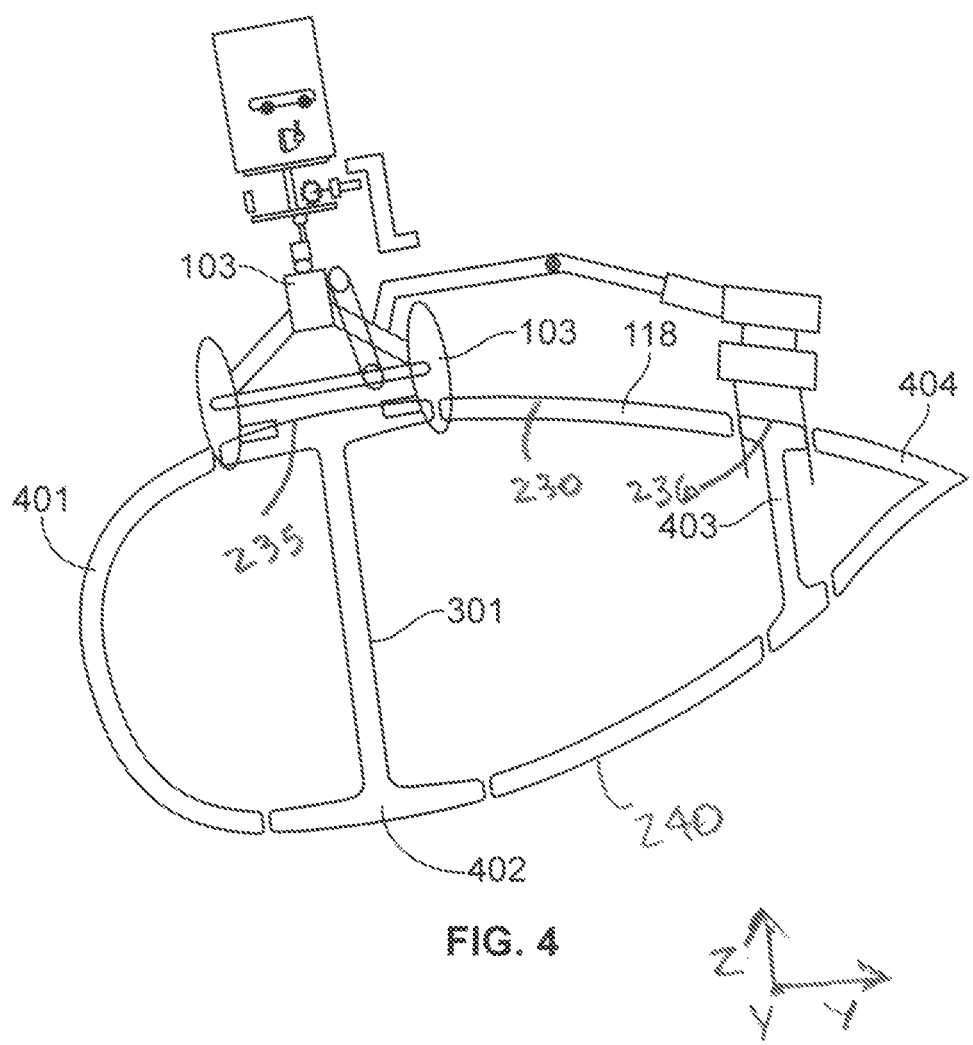
FIG. 4 depicts a particular illustrative embodiment of the invention showing an independent three-dimensional saw positioning system for a saw blade and an independent three-dimensional positioning a wind turbine blade section for cutting the wind turbine blade section.

FIG. 3 depicts a particular illustrative embodiment of the invention showing an independent three-dimensional saw positioning system for a saw blade and an independent three-dimensional wind turbine blade section positioning system for cutting the turbine blade section into pieces. As shown in FIG. 3, in another particular embodiment of the invention, the first saw set of two saw blades 103 are positioned over a first section 235 of the top surface of the wind turbine section adjacent each side of a top of a first spar 302 located inside of the wind turbine blade and running parallel to a longitudinal axis of the first spar. In another particular embodiment of the invention, the saw system further comprises a second saw 305 having a second set of two saw blades 306, wherein each of the second set of two saw blades is positioned adjacent the outer sides of a second spar 302 inside of a second section 236 of the wind turbine blade, so that the second set of blades run and cut parallel to a longitudinal axis of the second spar wherein the second saw is attached to the first saw so that the second saw cuts the shell of the wind turbine blade along the outside edges of the second spar along the with first set of saw blades cutting the first spar. The second set of saw blades is sprayed with water from a second set of water-jet sprayers forming a second mixture that drains into the trough. As shown in FIG. 3, FIG. 4 depicts a particular illustrative embodiment of the invention showing a three-dimensional positioning system for a saw blade and a wind turbine blade section for cutting the turbine blade section. In another particular embodiment of the invention, the system further includes but is not limited to a third saw 306 having a third set of two saw blades 307, wherein each of the third set of two saw blades is positioned adjacent a the outside edges of a third spar 303 inside of the wind turbine blade and run parallel to a longitudinal axis of the second spar wherein the third saw is attached to the first saw so that the third saw cuts the shell along the sides of the third spar along the with first set of saw blades cutting the first spar while the first and second saw move along the wind turbine blade section cutting through the wind turbine blade surface first and second spars. In another particular embodiment of the invention, the saw positioning system further comprises three hydraulically-activated three-dimensional saw positioners and the wind turbine positioning system further comprises three hydraulically-activated three-dimensional wind turbine blade positioners. The third set of saw blades is sprayed with water from a third set of water-jet sprayers forming a third mixture of water and saw dust that drains into the trough.

In a particular embodiment of the invention, a whole wind turbine blade 107 has been removed from a wind turbine in a wind turbine field. The systems and methods of the present invention disclosed herein and in the co-pending application by Denson, cited herein, work with wind turbine blades that are 50-300 feet or more long. In the present example, a 120 foot long wind turbine blade has removed for replacement is cut into three wind turbine blade sections 28, 29 and 25. The wind turbine blade is cut into three sections approximate 40 feet long when starting with a 120 foot long wind turbine blade, using the system and method and transverse saw cuts disclosed in co-pending U.S. Provisional Patent Application Ser. No. 62/837,665 filed on 23 Apr. 2019 by Mike Denson entitled A System and Method for Cutting and Manipulating Wind Turbine Blades. In a particular illustrative embodiment of the invention a system 100 and method for independent three-dimensional positioning a wind turbine blade section 29 and independently three-dimensional positioning a saw is disclosed. A wind turbine blade 107 and a first set of two saw blades 103 wherein, a wind turbine blade section 29 (in this case the middle section of wind turbine blade 107) is placed on a wind turbine blade support platform below a first saw 102 having a first set of two saw blades 103. The wind turbine blade support system is parallel to the ground on which it rests.

The first saw is suspended from an H-beam 104 above the upper surface of the wind turbine blade section 29. The system and method independently position the wind turbine blade section in three dimensions on the turbine blade support platform and independently position the first saw in three dimensions above the wind turbine blade resting on the wind turbine blade support system. The two three-dimensional positioning systems, one for the saw, one for the wind turbine blade section, operate independently of each other to independently position the saw and the wind turbine blade section. The system and method independently position the saw and the wind turbine blade section in three dimensions independently with respect to each other, so that the first saw and the first set of two saw blades attached to a self-propelled dolly on the H-beam run parallel to the surface of the wind turbine blade section and further align the two saw blades on each side of a top end of the large spar 301 and substantially parallel to a longitudinal axis for the wind turbine blade top surface and running a saw path along a longitudinal axis of the spar inside of the wind turbine blade section. This path cuts the spar out of the shell of the wind turbine blade section. A camera 135 is provided to enable an operator to see a position of the wind turbine blade and the first saw with respect to the wind turbine blade section. In a particular illustrative embodiment, two markers 330 are painted adjacent the outsides of the top large spar. An operator aligns the saw with the marks 330 using the camera to align two marks with two alignment balls 136 the saw so that its two blades cut through the wind turbine blade section just outside the edges of the top of the spar where the top of the spar joins with the inside of the wind turbine blade shell. The three-dimensional positioning creates a stretch of the upper surface prior to cutting operations to make cutting easier.

The wind turbine blade section is also positioned in three dimensions so that a top-side surface of a shell of the wind turbine blade section is substantially parallel to a path of the first set of two saw blades along wind turbine blade surface as the self-propelled saw travels along the H-beam along a longitudinal axis of the top surface of the wind turbine blade section. Once aligned, the first set of two saw blades cut through the wind turbine blade shell on each side of the top of the large spar along the longitudinal axis of the top surface of the wind turbine blade section from one end to the other of the wind turbine blade section. In another illustrative embodiment of the system and method of the invention, a second saw having a second set of saw blades makes additional cuts in the top surface of the shell of the wind turbine blade to allow pieces cut by the saw from the top shell surface that are formed by cutting the top shell to fall into the void inside of the turbine blade underneath the top shell. The wind turbine blade section is then flipped over on the in the wind turbine blade support system so that the top side is facing down away from the saw and bottom side is facing up toward the saw, positioning system on the wind turbine blade support system over a trough in the bottom of the wind. The bottom surface of the wind turbine shell forming the bottom side of the wind turbine blade is positioned with respect to the saw as described above with respect to positioning the top side shell surface and saw with respect to each other. After positioning the bottom side surface of the wind turbine blade shell and the saw with respect to each other and the spars, the saw traverses a substantially parallel path along a longitudinal axis of the wind turbine blade making longitudinal cuts through the shell on the bottom surface of the wind turbine blade, which is now on top and below the first saw first set of two saw blades suspended from the H-beam. The parallel saw path along the wind turbine blade shell enables a consistent depth of cut though the shell along the sides of the top of the large spar. Similar positioning is provided for the second and third saws that follow along the first saw to cut out the second and third spars.

After the saw has finished cutting through the top and bottom shells of the wind turbine blade section as described above, removing at least one of the spars, the wind turbine blade shell has been cut into five longitudinal section pieces, two longitudinal shell sections containing the first and second spars, a first section from outside the first spar, a second section from outside of the second spar and a top and bottom section from between the two spars. The two sections, the top and bottom section from between the two spars are cut into smaller longitudinal sections forming recyclable boards for building fences. After a plurality of wind turbine blade sections have been cut into section pieces as describe above, the section pieces are sorted so that matching section pieces are stored together stacked inside of each other. The stacking takes up substantially 60 to 80 percent less space that wind turbine blades that have not be cut, sorted and stacked. The sorted and stacked similar section pieces are now be stored for shipment. After cutting the wind turbine blade sections into section pieces, the sorted section pieces of five to seven wind turbine blades occupy the same volume that a single turbine blade would have occupied before being cut into section pieces. The reduced volume of the stacked and store section pieces takes up substantially sixty to eighty percent less volume than the uncut wind turbine blade section in a land fill and a transportation vehicle for movement to a landfill or recycling facility. The section pieces are recycled for use in construction projects such as building boards in place of 2×4s or I-beams or buried in a land fill.

In another particular embodiment of the invention, the saw system provides multiple saw blades that cut the top and bottom shells between the spars into multiple longitudinal sections. In a particular embodiment the saw provides 10 blades and the multiple longitudinal shell sections are 4 inches wide.

In a particular embodiment a water system sprays water on each side of each saw blade to lubricate the blade during cutting and to form a mixture of saw dust debris created from cutting the wind turbine blade shell. The mixture flows down from the saw blades cutting surface on the shell to a trough below the wind turbine blade positioning system, the trough having a narrowed bottom to capture the mixture and narrowed to reduce the weight of the mixture accumulated in the trough. The mixture is urged toward a plurality of drains in the bottom of the trough by a high pressure water from the water system that moves the mixture toward the drains. The drains flow down to a filter that removes the solids from the mixture and returns the filtered water to the water system to again spray on the saw blades and urge the mixture toward the drains. The solids from the mixture are removed from the filter for recycling rather than forming a dust cloud and particulates that would otherwise land in the soil surrounding the system.

The wind turbine blade 107 is thicker on a first round end that attaches to the wind turbine, than the thinner distal end that forms the outer tip of the wind turbine blade. Thus, when the wind turbine blade is place on the ground or another horizontal surface, the thicker end of the higher of the wind turbine blade is higher off the ground than the other end. This action relieves surface pressure, creating a stretch on the upper surface to make cutting of the top side easier. The wind turbine blade sections are likewise thicker on the end that is closer to the thicker end of the wind turbine blade. The turbine blade has a cross section with larger and thicker round first end and thinner pointed second end, thus the second thin end is farther away from the parallel H-beam and track of the saw blade above the surface of the wind turbine blade section when laid on the wind turbine blade support. In an illustrative embodiment, the system and method of the present invention raise the thin end of the wind turbine blade section for cutting. The thin end of the wind turbine blade section is raised by the independent three-dimensional turbine blade positioning system to make the top surface of the wind turbine blade section horizontal and parallel to the path of the first saw blade along the H-beam. In a particular illustrative embodiment, a winch is provided to raise and lower the H-beam. The parallel path of the first saw along the H-beam across the length of the wind turbine blade make a plurality of longitudinal cuts in the wind turbine blade in a single pass of the saw blades along the length of the wind turbine blade.

Figure 5:
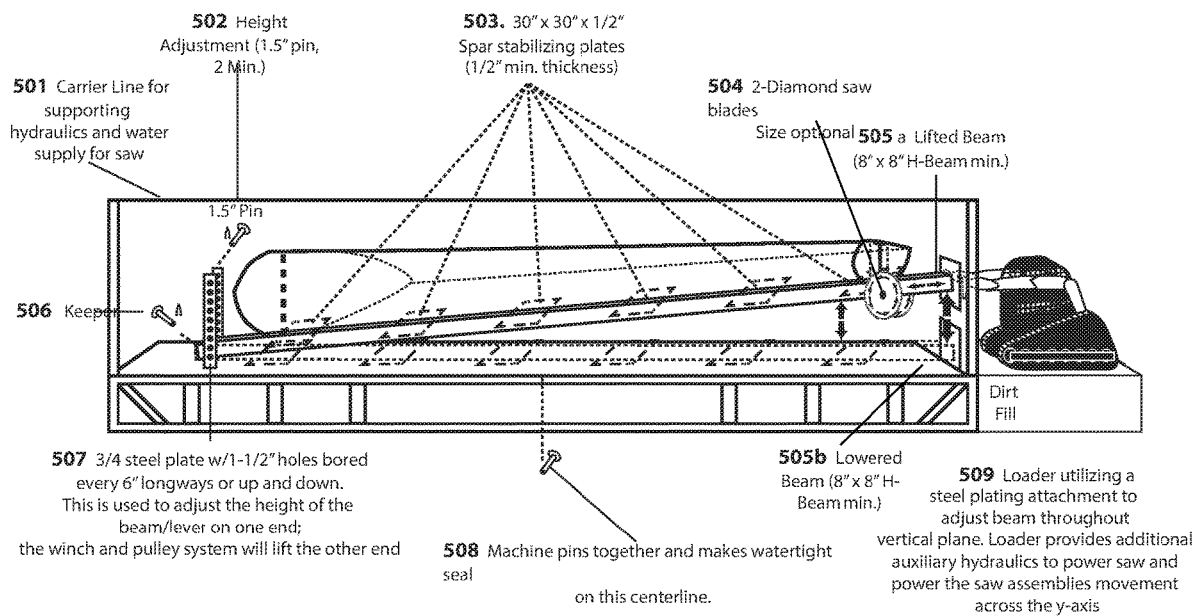
FIG. 5 depicts a particular illustrative embodiment of the invention wherein the saw cuts the bottom surface of a wind turbine blade section.

FIG. 5 depicts a particular illustrative embodiment of the invention wherein the saw cuts the bottom surface of a wind turbine blade section. As shown in FIG. 5, an undercut saw 504 runs along an H-beam 505 below the lower surface of the wind turbine blade section 29. For simplicity some of the components of the invention including but not limited to the camera, the drainage and water jet sprayer system are not shown in FIG. 5 and FIG. 6. The system and method independently position the wind turbine blade section in three dimensions on the turbine blade support platform and independently position the first saw in three dimensions below the wind turbine blade resting on the wind turbine blade support system. The two three-dimensional positioning systems, one for the saw, one for the wind turbine blade section, operate independently of each other to independently position the saw and the wind turbine blade section. The system and method independently position the saw and the wind turbine blade section in three dimensions independently with respect to each other, so that the undercut saw and the first set of two saw blades attached to a self-propelled dolly on the H-beam run parallel to the bottom surface of the wind turbine blade section and further align the two saw blades on each side of a bottom end of the large spar 301 and substantially parallel to a longitudinal axis for the wind turbine blade bottom surface and running a saw path along a longitudinal axis of the spar inside of the wind turbine blade section. This path cuts the spar out of the shell of the wind turbine blade section. A camera 135 is provided to enable an operator to see a position of the wind turbine blade and the first saw with respect to the wind turbine blade section. In a particular illustrative embodiment, two markers 330 are painted adjacent the outsides of the top large spar. An operator aligns the saw with the marks 330 using the camera to align two marks with two alignment balls 136 the saw so that its two blades cut through the wind turbine blade section just outside the edges of the top of the spar where the top of the spar joins with the inside of the wind turbine blade shell. The three-dimensional positioning creates a stretch of the bottom surface prior to cutting operations to make cutting easier.

A carrier line 501 for supporting hydraulics and water supply for the undercut saw is shown. A height adjustment pin 502 is shown. Spar stabilizer plates 503 are shown. Two saw blades are provided on undercut saw 504. A lifted H-beam 505 is lifted on one end to adjust the path of the undercut saw along the wind turbine blade surface. A keeper 506 is provided. A ¾ inch steel plate 507 w/1½" holes bored every 6" longways or up and down is used to adjust the height of the H-beam/lever on one end and the winch and pulley system will lift the other end of the beam. Machine pins 508 together and makes watertight seal in the trough that catches debris and water. A loader 509 utilizing a steel plating attachment to adjust the H-beam throughout vertical plane. Loader provides additional auxiliary hydraulics to power saw and power the saw assemblies movement across the y-axis. A lifted H-beam position is shown at 505. A lowered position 505b is shown in dashed lines for the H-beam.

The wind turbine blade section is also positioned in three dimensions so that a bottom-side surface of a shell of the wind turbine blade section is substantially parallel to a path of the undercut saw set of two saw blades along wind turbine blade surface as the self-propelled saw travels along the H-beam along a longitudinal axis of the bottom surface of the wind turbine blade section. Once aligned, the first set of two saw blades cut through the wind turbine blade shell on each side of the top of the large spar along the longitudinal axis of the bottom surface of the wind turbine blade section from one end to the other of the wind turbine blade section. The wind turbine blade section is then flipped over on the in the wind turbine blade support system so that the bottom side of the wind turbine blade section is facing up and away from the undercut saw and bottom side is facing up away from the undercut saw, positioning system on the wind turbine blade support system over a trough in the bottom of the wind turbine blade. The top surface of the wind turbine shell forming the top side of the wind turbine blade is positioned with respect to the undercut saw as described above with respect to positioning the bottom side shell surface and undercut saw with respect to each other. After positioning the top side surface of the wind turbine blade shell and the undercut saw with respect to each other and the spars, the undercut saw traverses a substantially parallel path along a longitudinal axis of the wind turbine blade making longitudinal cuts through the shell on the top surface of the wind turbine blade, which is now on bottom after flipping and above the undercut saw first saw first set of two saw blades attached from the H-beam 505. The parallel saw path along the wind turbine blade shell enables a consistent depth of cut though the shell along the sides of the top of the large spar. Similar positioning is provided for the second and third saws that follow along the first saw to cut out the second and third spars.

FIG. 6 depicts a particular illustrative embodiment of the invention wherein the saw cuts the bottom surface of a wind turbine blade section. A spar stabilizer 601 is positioned under the large spar. The H-beam 505 upon which the undercut saw 504 travels, is positioned with a vertical depth adjustment hydraulic cylinder 603 positions the H-beam parallel to the bottom surface of the wind turbine blade, as discussed above. A drive shaft 604 positions the H-beam and attached undercut saw horizontally left and right to adjust the H-beam and attached saw for a cutting path parallel to the sides of the large spar cap. a low speed hydraulic motor drive the undercut saw along the beam. Auxiliary 1 has 3 line inputs to saw's hydraulic motor consisting of a hydraulic line in, a hydraulic line out, and a case drain Auxiliary 2 has 2 line inputs to the crawl function that moves the saw along the y-axis consisting of a hydraulic line in and hydraulic line out.

A system is disclosed, including but not limited to an H-beam suspended from a saw rack above a wind turbine blade support platform; a self-propelled first saw having a dolly attached to a first saw having a first set of two saw blades, wherein the self-propelled first saw is attached to a moving dolly moving along the H-beam; an independent three-dimensional saw positioning system comprising an x-y-axis saw positioner and a z-axis saw positioner; a wind turbine blade supported by the wind turbine blade support platform; an independent three-dimensional wind turbine blade positioning system comprising an x-axis wind turbine blade positioner, a y-axis wind turbine blade positioner and a z-axis wind turbine blade positioner, wherein the three-dimensional saw positioning system and the three-dimensional wind turbine blade positioning system manipulate the self-propelled saw and the wind turbine blade so that a top surface of an outer shell of the wind turbine blade and a longitudinal axis of a path for the self-propelled first saw are substantially parallel so that the path of the first set of two saw blades along the longitudinal axis of the wind turbine blade, cuts through the outer shell of the wind turbine blade; and a trough positioned below the wind turbine blade.

In another particular illustrative embodiment of the invention, the system further includes but is not limited to a water system having a water supply line and a plurality of water-jet sprayers, wherein each one of the plurality of water-jet sprayers is positioned adjacent one the first set of two saw blades that spray the first set of two saw blades creating a mixture of water and debris generated from the first set of two saw blades cutting through the wind turbine blade shell; and a trough positioned below the wind turbine blade support platform for receiving the mixture from the first set of two saw blades. The water from the water-jet sprayers substantially eliminates airborne debris created by the saw cutting the wind turbine blade so that the debris are captured in the mixture of water and debris.

In another particular illustrative embodiment of the invention, the system further includes but is not limited to a drain formed in a bottom of the trough for removing from the bottom of the trough, a mixture of debris and water created by the plurality of water-jet sprayers spraying on the first set of saw blades during cutting the wind turbine blade, wherein the water-jet sprayers, spray water on the mixture urging the mixture toward the drain and returning water filtered from the mixture to the water-jet sprayer. In another particular illustrative embodiment of the invention, the system further includes but is not limited to a drain formed in a bottom of the trough; a pump in line between the drain and a water system return path; a filter in line between the drain and a water system return path, wherein the filter separates the water and debris from the mixture of water and debris, wherein the water system return path returns the water separated by the filter to the water supply system.

In another particular illustrative embodiment of the invention, the first set of two saw blades is positioned over the top surface of the wind turbine blades adjacent each side of a first spar located inside of the wind turbine blade and running parallel to a longitudinal axis of the first spar. In another particular illustrative embodiment of the invention, the saw system further comprises a second saw having a second set of two saw blades, wherein each of the second set of two saw blades is positioned adjacent a side of a second spar inside of the wind turbine blade and run parallel to a longitudinal axis of the second spar wherein the second saw is attached to the first saw so that the second saw cuts the shell along the sides of the second spar along the with first set of saw blades cutting the first spar. In another particular illustrative embodiment of the invention, the three-dimensional saw positioning system further includes but is not limited to three hydraulically-activated three-dimensional saw positioners and the three-dimensional wind turbine positioning system further comprises three hydraulically-activated three-dimensional wind turbine blade positioners.

In another particular illustrative embodiment of the invention, the hydraulically-activated three-dimensional saw positioners are attached to the H-beam wherein the x-y saw positioners are attached to a pulley system that moves the H-beam so that the first saw moves in an x-y direction perpendicular to the longitudinal axis of the H-beam and the z-axis saw is attached to the first saw between the first saw and the H-beam and moves the first saw in a z direction perpendicular to the x-y direction H-beam and wherein the hydraulically-activated three-dimensional wind turbine blade positioners are attached to the wind turbine blade support platform wherein the x-y saw positioners move the wind turbine blade support rack so that the first saw moves in an x-y direction perpendicular to the longitudinal axis of the wind turbine blade support rack and the z-axis wind turbine blade positioner moves the wind turbine blade in a z direction perpendicular to the x-y direction a longitudinal axis of the wind turbine blade support system. In another particular illustrative embodiment, the pulley includes a winch that raises and lowers the H-beam in the z direction.

In another particular illustrative embodiment of the invention, the system further includes but is not limited to a camera and a set of hanging ball positioners, wherein an operator looks at the hanging ball positioners through the camera to align marks on the wind turbine blade and the first saw so that the first set of two saw blades cut the wind turbine blade along outside edges of a spar inside of the wind turbine blade. In another particular illustrative embodiment of the invention, the three-dimensional saw positioning system further comprises a pulley system for positioning the first saw in an x and y direction.

A method is disclosed, including but not limited to suspending an H-beam from a saw rack above a wind turbine blade support platform; propelling a first saw having a dolly attached to a first saw having a first set of two saw blades, wherein the self-propelled first saw is attached to a moving dolly moving along the H-beam; independently positioning the first saw in three dimensions using a three-dimensional saw positioning system comprising an x-y-axis saw positioner and a z-axis saw positioner; supporting a wind turbine blade on the wind turbine blade support platform; independently positioning the wind turbine blade on the turbine blade support platform in three dimensions using a three-dimensional positioning system comprising an x-axis wind turbine blade positioner, a y-axis wind turbine blade positioner and a z-axis wind turbine blade positioner, wherein the three-dimensional saw positioning system and the three-dimensional wind turbine blade positioning system manipulate the self-propelled saw and the wind turbine blade so that a top surface of an outer shell of the wind turbine blade and a longitudinal axis of a path for the self-propelled first saw are substantially parallel so that the path of the first set of two saw blades along the longitudinal axis of the wind turbine blade, cuts through the outer shell of the wind turbine blade; and receiving in a trough positioned below the wind turbine blade, a saw dust and water mixture from the cuts.

In another particular illustrative embodiment of the invention, the method further includes but is not limited to supplying water from a water system having a water supply line to a plurality of water-jet sprayers, wherein each one of the plurality of water-jet sprayers is positioned adjacent one the first set of two saw blades that spray the first set of two saw blades creating a mixture of water and debris generated from the first set of two saw blades cutting through the wind turbine blade shell; and receiving the mixture in a trough positioned below the wind turbine blade support platform for receiving the mixture from the first set of two saw blades. In another particular illustrative embodiment of the invention, the method further includes but is not limited to removing the mixture from the trough through a drain formed in a bottom of the trough for removing from the bottom of the trough, the mixture of debris and water created by the plurality of water-jet sprayers spraying on the first set of saw blades during cutting the wind turbine blade, wherein the water-jet sprayers, spray water on the mixture urging the mixture toward the drain and returning water filtered from the mixture to the water-jet sprayer.

In another particular illustrative embodiment of the invention, the method further includes but is not limited to pumping the mixture using a pump in line between the drain and a water system return path; straining the debris from the mixture by pumping the mixture through a filter in line between the drain and a water system return path, wherein the filter separates the water and debris from the mixture of water and debris; and returning the water separated from the mixture by the filter; and returning water wherein the water system return path returns to the water supply system. In another particular illustrative embodiment of the invention, the first set of two saw blades is positioned over the top surface of the wind turbine blades adjacent each side of a first spar located inside of the wind turbine blade and running parallel to a longitudinal axis of the first spar. In another particular illustrative embodiment of the invention, the method further includes but is not limited to a second saw having a second set of two saw blades, wherein each of the second set of two saw blades is positioned adjacent a side of a second spar inside of the wind turbine blade and run parallel to a longitudinal axis of the second spar wherein the second saw is attached to the first saw so that the second saw cuts the shell along the sides of the second spar along the with first set of saw blades cutting the first spar.

In another particular illustrative embodiment of the invention, the three-dimensional saw positioning system further comprises three hydraulically-activated three-dimensional saw positioners and the three-dimensional wind turbine positioning system further comprises three hydraulically-activated three-dimensional wind turbine blade positioners. In another particular illustrative embodiment of the invention, the hydraulically-activated three-dimensional saw positioners are attached to the H-beam wherein the x-y saw positioners are attached to a pulley system that moves the H-beam so that the first saw moves in an x-y direction perpendicular to the longitudinal axis of the H-beam and the z-axis saw is attached to the first saw between the first saw and the H-beam and moves the first saw in a z direction perpendicular to the x-y direction H-beam and wherein the hydraulically-activated three-dimensional wind turbine blade positioners are attached to the wind turbine blade support rack wherein the x-y saw positioners move the wind turbine blade support rack so that the first saw moves in an x-y direction perpendicular to the longitudinal axis of the wind turbine blade support rack and the z-axis wind turbine blade positioner moves the wind turbine blade in a z direction perpendicular to the x-y direction a longitudinal axis of the wind turbine blade support system.

In another particular illustrative embodiment of the invention, the method further includes but is not limited to aligning the marks on the wind turbine blade and the first saw using a camera and the two independent three-dimensional positioning systems, so that the first set of two saw blades cut the wind turbine blade along the edges of a spar inside of the wind turbine blade. In another particular illustrative embodiment of the invention, the three-dimensional saw positioning system further comprises a pulley system for positioning the first saw in an x and y direction.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art upon reviewing the above description. The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing. Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system comprising:
 a saw platform;
 a wind turbine blade support platform positioned below the saw platform;
 an H-beam suspended from the saw platform above the wind turbine blade support platform;
 a dolly slidably attached to the H-beam;
 a first saw having a first set of two saw blades, wherein the first saw is attached to the dolly;

an independent three-dimensional saw positioning system comprising an X, Z-axis saw positioner and a y axis saw positioner, wherein the three-dimensional saw positioning system is attached to the wind turbine blade support platform above the wind turbine blade; an independent three-dimensional wind turbine blade positioning system comprising an X, Z-axis wind turbine blade positioner and a v axis wind turbine blade positioner, wherein the three-dimensional wind turbine blade positioning system is attached to the wind turbine blade support platform below a wind turbine blade, wherein a wind turbine blade top surface and bottom surface are closed and the bottom surface of the wind turbine blade lays on wind turbine blade support platform;

the wind turbine blade supported by the wind turbine blade support platform, wherein the wind turbine blade has a curvilinear top surface in an x, z cross section of the wind turbine blade and a curvilinear bottom surface in the x, z cross section wherein the x, z cross section is perpendicular to a Y axis parallel to a longitudinal axis of the wind turbine blade;

a first spar having a top surface with a first edge and a second edge and located adjacent and below of the wind turbine blade curvilinear top surface, wherein the first set of two saw blades are coaxially mounted side by side and outside of each side of the first spar located inside of the wind turbine blade, wherein the first saw is configured to be positioned so that a first one of the two coaxial parallel saw blades is on the outside of the first edge of the top surface of the spar and a second one of the two coaxial parallel saw blades is on an outside of the second edge of the bottom surface of the spar parallel to a longitudinal axis of the H-beam and a path of the two saw blades during cutting of the first spar in the wind turbine blade, wherein the three-dimensional wind turbine blade positioning system is configured to place the top surface of the wind turbine blade parallel to the path of the first saw; and a second saw having a second set of two coaxial parallel blades second one of the two coaxial parallel blades is on the outside of a second edge of a bottom surface of the spar on the curvilinear bottom surface of the wind turbine blade wherein the three-dimensional saw positioning system is configured to place the bottom surface of the wind turbine blade parallel to the path of second saw.

2. The system of claim 1, wherein the first set of two saw blades each have a 5 inch radius and are positioned to accommodate a 3 inch depth of cut for the first set of 5 inch radius saw blades to cut through top surface of the wind turbine blade, wherein the top surface is 2 inches thick, the system further comprising:

a water system having a water supply line and a plurality of water-jet sprayers, wherein each one of the plurality of water-jet sprayers is positioned adjacent one the two saw blades that sprays water on the two saw blades, creating a mixture of water and debris generated from the first set of two saw blades cutting through the top surface of the wind turbine blade; and a trough positioned below the wind turbine blade support platform for receiving the mixture of water and debris.

3. The system of claim 2, the system further comprising:

a drain formed in a bottom of the trough for removing from the bottom of the trough, the mixture of water and debris created by the plurality of water-jet sprayers spraying on the first set of saw blades during cutting the wind turbine blade, wherein the water-jet sprayers spray water on the mixture urging the mixture toward the drain and returning water from a filter, wherein the returning water is filtered from the mixture of water and debris and returned to the water-jet sprayer.

4. The system of claim 3, the system further comprising:

a pump in line between the drain and a water system return path;

wherein the filter is configured in line between the drain and a water system return path, wherein the filter separates the water and debris from the mixture of water and debris, wherein the water system return path returns the water separated by the filter to the water supply system.

5. The system of claim 1, wherein the the independent three-dimensional wind turbine blade positioning system is configured to position a thin end of the wind turbine blade so that the thin end is further raised to make the top surface of the wind turbine blade section parallel to the path of the first saw along the H-beam.

6. The system of claim 5, wherein the x, z saw positioners are attached to a pulley system that moves the first saw and the H-beam so that the first saw moves in an x, z plane perpendicular to the longitudinal axis of the H-beam and the y axis saw is attached to the first saw between the first saw and the H-beam and moves the first saw in a y direction perpendicular to the x, z direction H-beam and wherein the x, z saw positioners move the wind turbine blade support platform so that the first saw moves in an x, z direction perpendicular to the longitudinal axis of the wind turbine blade support platform and the z-axis wind turbine blade positioner moves the wind turbine blade in a z direction perpendicular to the x, z plane along the longitudinal axis of the wind turbine blade support system.

7. The system of claim 6, the system further comprising:

a camera having a display configured for viewing a set of hanging ball positioners for positioning the wind turbine blade.

8. The system of claim 5, wherein the three-dimensional saw positioning system further comprises a pulley system for positioning the first saw in an x and z direction.

* * * * *